United States Patent [19]
Green

[11] 3,979,816
[45] Sept. 14, 1976

[54] BOILER TUBE EXTRACTOR AND METHOD

[76] Inventor: Bernard S. Green, 3431 Ridge Ave., Philadelphia, Pa. 19132

[22] Filed: Jan. 17, 1975

[21] Appl. No.: 541,975

[52] U.S. Cl. ............................... 29/427; 29/244; 29/157.3 C
[51] Int. Cl.² ............................... B23P 19/02
[58] Field of Search ............ 29/244, 234, 237, 252, 29/282, 202 R, 280, 255, 157.3 C, 427, 157.4

[56] References Cited
UNITED STATES PATENTS

| | | | |
|---|---|---|---|
| 1,459,131 | 6/1923 | Alexander | 29/244 |
| 3,087,236 | 4/1963 | Paytas | 29/244 |
| 3,299,496 | 1/1967 | Christensen | 29/237 |
| 3,846,892 | 11/1974 | Young | 29/282 |

*Primary Examiner*—James L. Jones, Jr.
*Attorney, Agent, or Firm*—Stuart E. Beck

[57] ABSTRACT

A boiler tube extractor comprising an elongated member which can be coupled to and extend forwardly of the tube sheet of a boiler. An actuable pulling means can be coupled between the end of the elongated member remote from the tube sheet and the tube which is to be extracted. When the means is actuated, the boiler tube is extracted.

9 Claims, 3 Drawing Figures

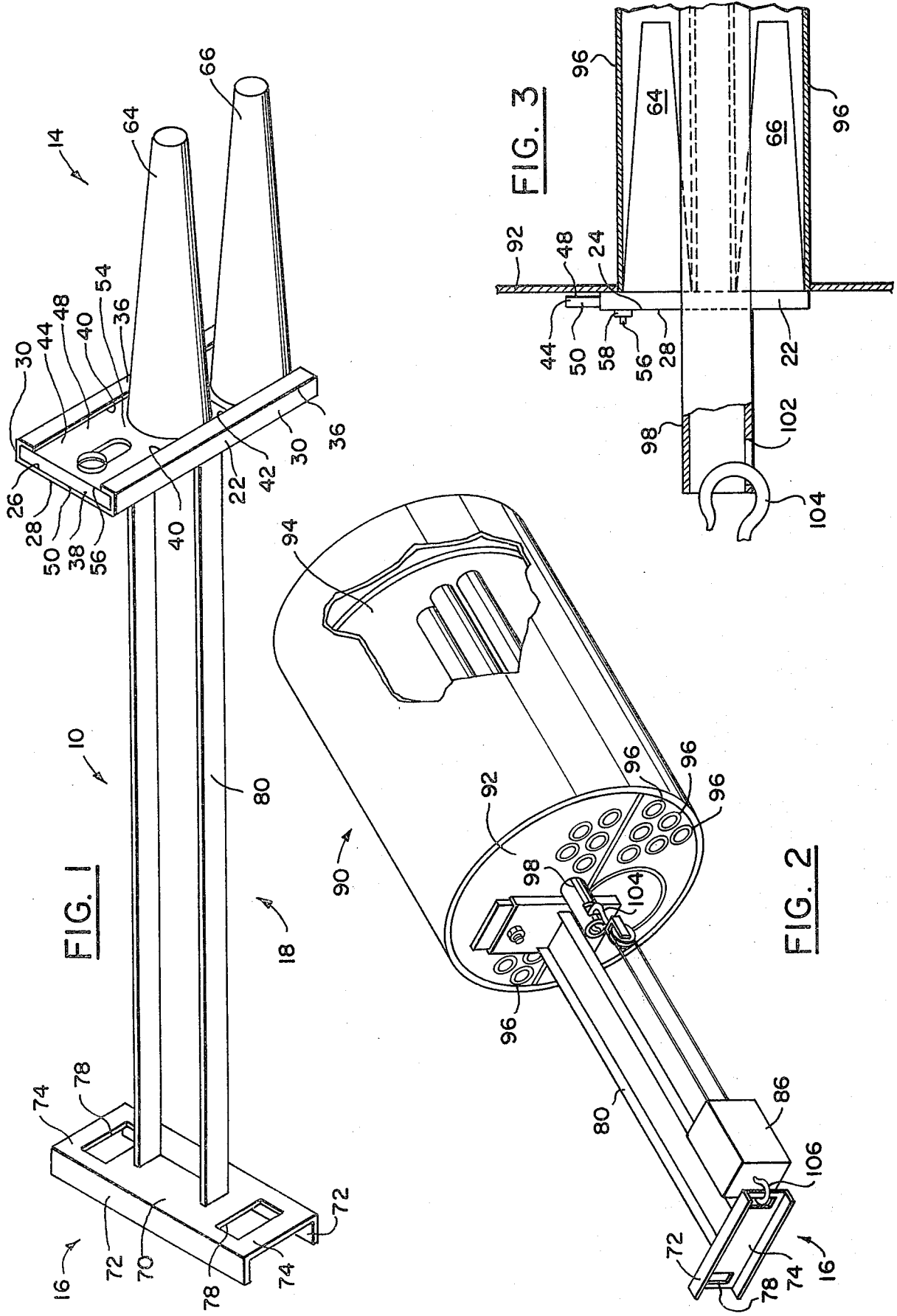
U.S. Patent  Sept. 14, 1976  3,979,816

BOILER TUBE EXTRACTOR AND METHOD

This invention relates to a device and method for extracting boiler tubes, and more particular to a device which is simple and inexpensive to manufacture and which can be operated by relatively unskilled personnel.

While servicing boilers, occasionally it becomes necessary to remove one or more of the boiler tubes from the tube bundle within the boiler.

Typically, the boiler tubes are supported at their ends by plates which are called tube sheets. Generally, each of the tube sheets has a hole through which the boiler tube can be inserted and by which it is supported. Over a period of time, some of the boiler tubes in the bundle corrode to the extent that they are not usable and they must be replaced. However, the corrosion causes the tubes to become tightly connected to each of the tube sheets. Even after the ends of the tubes can be freed from the tube sheets, the disruptions on their surfaces which are caused by corrosion make it virtually impossible for them to be drawn from the tube sheet without the exertion of a substantial pulling force.

Typically, boiler tubes are extracted by first being disengaged from the boiler tube sheets which support them at each end. This can be done by cutting the walls of the tubes or by using any of the extraction tools which are well known in the art. These means are satisfactory for pulling a few inches of the tube out of the tube sheet.

At this point, a pulling means such as a winch or differential pulley or other device is connected between the boiler tube and a suitable anchor at the site of the boiler. Typically, the anchor may be machinery, pipes, stairwells, pilings or other fixed devices. Actuation of the pulling device causes the boiler tube to be extracted.

However, it is apparent that a boiler tube may have to be extracted from a boiler where no anchor of the type which has been used heretofore is available or where even though such anchors are available, they are so far from the boiler that the available pulling means is not long enough to be successfully coupled therebetween.

The present invention discloses a method and device for obviating the problem described above. It includes in one aspect a first means which may be placed in substantial bearing relation to one of the tube sheets in the boiler and adjacent to the tube which is to be extracted. It includes second means which are spaced from the first means. The second means includes means for being coupled to a pulling member so that the pulling member can be connected to the tube which is to be extracted. Finally, the device includes a third means which is disposed between the first and second means.

In another aspect, the invention relates to a method for extracting a boiler tube from between two boiler tube sheets which support a plurality of boiler tubes which comprises the steps of withdrawing the end of the tube to be extracted from one of the boiler tube sheets, providing a coupling element on said end, mounting an elongated member on said tube sheet, connecting an actuable pulling member between the coupling element on the end of the tube and the end of the elongated member remote from the coupling element, and actuating the pulling member to extract said tube from the tube sheet.

For the purpose of illustrating the invention, it is shown in the drawings a form which is presently preferred; it being understood, however, that this invention is not limited to the precise arrangements and instrumentalities shown and wherein:

FIG. 1 is a pictorial illustration of a device constructed in accordance with a presently preferred form of the invention.

FIG. 2 is a perspective view of the device illustrated in FIG. 1 mounted on a boiler and in position to extract a boiler tube.

FIG. 3 is a close up view partially in section of a portion of FIG. 2.

Now referring to the drawing for a detailed description of the invention, a device for extracting boiler tubes 10 which is constructed in accordance with a presently preferred form thereof, is illustrated in FIG. 1. It comprises a first means 14, a second means 16 which is disposed rearwardly of and in spaced relation from the first means and a third means 18 which is disposed between the first and second means.

First means 14 comprises a generally "C" shaped channel 22 which includes a plate 24 having two opposed major surfaces 26 and 28. Opposed edges of plate 24 support forwardly extending walls 30.

The distal end of each wall 30 supports an inwardly extending panel 36. The panels 36 are in spaced parallel relation to the front surface 26 of plate 24 to define a guideway 38 between the plate 24 and the panels 36. The distal edges 40 of the panels 36 are spaced from each other to define a slot 42.

First means 14 also includes a second plate 44 having first and second major surfaces 48 and 50. The second plate is disposed within guideway 38 with surfaces 26 and 50 in facing, sliding relation to each other. It is constrained for vertical movement relative to plate 24 by walls 30 and panels 36.

Plate 44 may be constrained against movement relative to plate 24 by an elongated vertically disposed slot 54 therein which cooperates with a threaded member 56 which extends through the slot. Threaded member 56 may be coupled to plate 24 by any conventional means such as by extending through an aperture (not shown) and being secured to a nut 58 on the rear surface 28 of plate 24 (FIG. 3).

Both plate 24 and plate 44 support elongated forwardly extending elements 64 and 66 which are to be telescopically received in the boiler tubes which are adjacent to the tube which is to be extracted. The elements 64 and 66 may be tapered so that their cross sections are gradually reduced as they extend forwardly from the plates. Element 64 extends through slot 42.

Since one element is connected to plate 24 and the other element is connected to plate 44, it is apparent that displacement of plate 44 in guideway 38 will change the distance between elements 64 and 66 over a predetermined range which is defined by slot 54.

Second means 16 may comprise an elongated channel 70 whose legs 72 extend rearwardly of the device and whose major dimension is laterally directed with respect to the first means 14 so that the end portions 72 of channel 70 extend beyond walls 30.

Suitable coupling means 78 may be provided on end portions 74. While the particular nature of the coupling means is not critical to the invention, it has been found particularly advantageous to form apertures in the laterally extending portions so that hooks or like complementary coupling means can be connected thereto.

The third means 18 may comprise a suitable structural member such as the channel 80 illustrated. The channel is coupled at its ends to the rear surface 28 of plate 24 and the second means 16. Preferably, channel 80 is at least as long as the boiler tube which is to be extracted.

The device is used in connection with a suitable actuable pulling means 86. The pulling means may comprise a differential pulley, a block and tackle, a winch, or the like. A particularly suitable pulling means would be a winch-hoist of the type which is manufactured by the Lugall Company of Haverford, Pennsylvania.

Referring now to FIGS. 2 and 3 for a detailed description of the manner of using the device, a boiler 90 is illustrated in FIG. 2. The end door has been removed and a portion of the side wall has been cut away so that front and rear tube sheets 92 and 94 and the boiler tubes 96 which they support can be seen. The operation of the device will be described with reference to extracting boiler tube 98 from the tube sheets.

Initially, a few inches of the boiler tube 98 are extracted from the tube sheets. This is accomplished by any suitable means. There are a number of tools readily available on the market and discussed in substantial detail in the patent literature which are capable of achieving this objective. In the event that tools are not available, the tube can be freed from the tube sheets by a blow torch, its side walls may be slit and then it may be driven forward a few inches.

A suitable coupling means may be connected to or may be formed in the exposed end of the tube 98. Numerous devices exist for forming a coupling. However, the simplest and most useful device in the context of the present invention is the formation of an aperture 102 in the side wall of the tube.

The device 10 is then mounted on the tube sheet 92. This is accomplished by displacing plates 24 and 44 relative to each other so that the distance between elements 64 and 66 corresponds to the distance between any two boiler tubes 96 which are adjacent boiler tube 98, the boiler tube which is to be extracted. The elements 64 and 66 are then inserted into the two boiler tubes adjacent to tube 98 until the first means 14 bears against the tube sheet 92. This causes the device to assume the position illustrated in FIG. 2 where it extends well forwardly of the tube sheet. An actuable pulling means 86 of the type described above is then coupled between aperture 78 in element 72 and aperture 102 in tube 98. This can be accomplished by using hooks 104 and 106 as shown. The pulling means 86 is then actuated to withdraw boiler tube 98 from tube sheet 78.

It should be appreciated that a bending force is exerted on the device by the actuation of pulling means 86 due to the fact that the pulling means is laterally displaced from elements 64 and 66. However, this bending force is counteracted by elements 64 and 66 since they extend into the adjacent boiler tubes a sufficient distance to react thus force.

Furthermore, it should be appreciated that the device disclosed herein could be made of one integral unit with the pulling means attached thereto. Further, it could be made with one element 64 or 66 if that element were of substantial size.

Nevertheless, the device disclosed herein is simple to manufacture and can be used by relatively unskilled persons to greatly simplify and reduce the time involved in removing selected boiler tubes from boiler tube sheets.

Finally, while the device and method have been disclosed in the context of extracting boiler tubes from boilers, they employed in any situation where tubes must be extracted from a tube bundle.

While the invention has been described with reference to one particular embodiment thereof, it is apparent that many other forms and embodiments to be obvious to those skilled in the art in view of the foregoing description. Thus, the scope of the invention should not be limited by the foregoing description but, rather, only by the scope appended hereto.

I claim:

1. A device for extracting a boiler tube from between boiler tube sheets to which a plurality of tubes are connected comprising first means for being placed in substantially bearing relation to one of the tube sheets and adjacent the tube which is to be extracted, second means, said second means being disposed rearwardly of and spaced from said first means, said second means including means for being coupled to an elongated pulling member so that the pulling member can be connected to the tube which is to be extracted, and a third means, said third means comprising an elongated member, said elongated member being disposed between said first and second means, and wherein said first means comprises means for supporting said device on the tube sheet, said support means comprising means for engaging the tube sheet, and at least one element coupled to and extending forwardly from said support means, said element having a cross section which enables it to be telescopically received in another boiler tube.

2. A device as defined in claim 1 including a second element coupled to and extending from said engaging member in spaced relation from said one element and extending in the same direction as said one element, and said second element has a cross section which will enable it to be telescopically received in another boiler tube.

3. A device for extracting a boiler tube from between boiler tube sheets to which a plurality of tubes are connected comprising first means for being placed in substantially bearing relation to one of the tube sheets and adjacent the tube which is to be extracted, second means, said second means being disposed rearwardly of and spaced from said first means, said second means including means for being coupled to an elongated pulling member so that the pulling member can be connected to the tube which is to be extracted, and a third means, said third means comprising an elongated member, and said elongated member is disposed between said first and second means, and wherein said first means includes first and second plates, said first plate having one of its major surfaces coupled to said elongated member, said second plate having at two major surfaces, means for coupling said second plate to said first plate with a major surface on one of said plates being in facing relation to a major surface on said second plate, means for coupling said first and second plate to each other, said means enabling said plates to be displaced relative to each other over a predetermined range, means for retaining said plates at any relative displacement in said range, an element coupled to each of said plates, each of said elements extending forwardly from its respective plate so that said elements can be received in boiler tubes whose spacing is within said range to thereby support said device while a boiler tube is being extracted.

4. A device as defined in claim 3 wherein said second means is an elongated member which has portions that extend laterally of said first and second plates, and said coupling means are disposed on said portions.

5. A device for extracting a boiler tube from between boiler tube sheets to which a plurality of tubes are connected comprising first means for being placed in substantially bearing relation to one of the tube sheets and adjacent the tube which is to be extracted, second means, said second means being disposed rearwardly of and spaced from said first means, said second means including means for being coupled to an elongated pulling member so that the pulling member can be connected to the tube which is to be extracted, and a third means, said third means comprising an elongated member, and said elongated member is disposed between said first and second means, and wherein said first member includes first and second plates, said first plate including opposed edges, each of said edges supporting a forwardly extending wall, the distal end of each of said walls supporting inwardly extending panels which are in spaced relation to said first plate thereby defining a guideway between said first plate and said panels, the distal edges of said panels being spaced from each other to define a slot therebetween, an element coupled to said first plate and extending forwardly through said slot, said second plate being slidably received in said guideway for displacement relative to said first plate over a predetermined range, an element coupled to said second plate and extending forwardly through said slot, said last named element being movable along said slot as said second plate is displaced in said guideway, and both of said elements having a cross section which will enable them to be telescopically received in two spaced boiler tubes, and means for fixing said first and second plates against relative movement so that said first and second elements can be aligned with the boiler tubes adjacent the tube which is to be extracted.

6. A device as defined in claim 5 wherein said means for fixing said plates against relative movement comprises a slot in one of said plates and a threaded fastener coupled to the other of said plates and extending through said slot.

7. A device as defined in claim 5 wherein said forwardly extending elements are tapered so that their cross sections are gradually reduced as they extend forwardly from said first and second plates.

8. A method for extracting a boiler tube from between two boiler tube sheets which support a plurality of boiler tubes comprising the steps of withdrawing the end of the tube to be extracted from one of the boiler tube sheets, providing a coupling element on said end of said tube, mounting an elongated member on said tube sheet by inserting a portion of one end thereof into at least one boiler tube adjacent the tube which is to be extracted, said elongated member being at least as long as the tube which is to be extracted, connecting an actuable pulling member between said coupling element on said end of said tube and the end of said elongated member remote from said coupling element, and actuating said pulling member to extract said tube from said tube sheet.

9. The method as defined in claim 8 wherein said coupling element is formed by cutting a hole in the wall of the tube which is to be extracted.

* * * * *

UNITED STATES PATENT OFFICE
CERTIFICATE OF CORRECTION

PATENT NO. : 3,979,816
DATED : September 14, 1976
INVENTOR(S) : Bernard S. Green It is certified that error appears in the above-identified patent and that said Letters Patent are hereby corrected as shown below:

Column 4, Line 55; after "having at" insert --least--;

Line 60; change "plate" to --plates--.

Signed and Sealed this

Sixteenth Day of November 1976

[SEAL]

Attest:

RUTH C. MASON
*Attesting Officer*

C. MARSHALL DANN
*Commissioner of Patents and Trademarks*